United States Patent Office 2,920,596
Patented Jan. 12, 1960

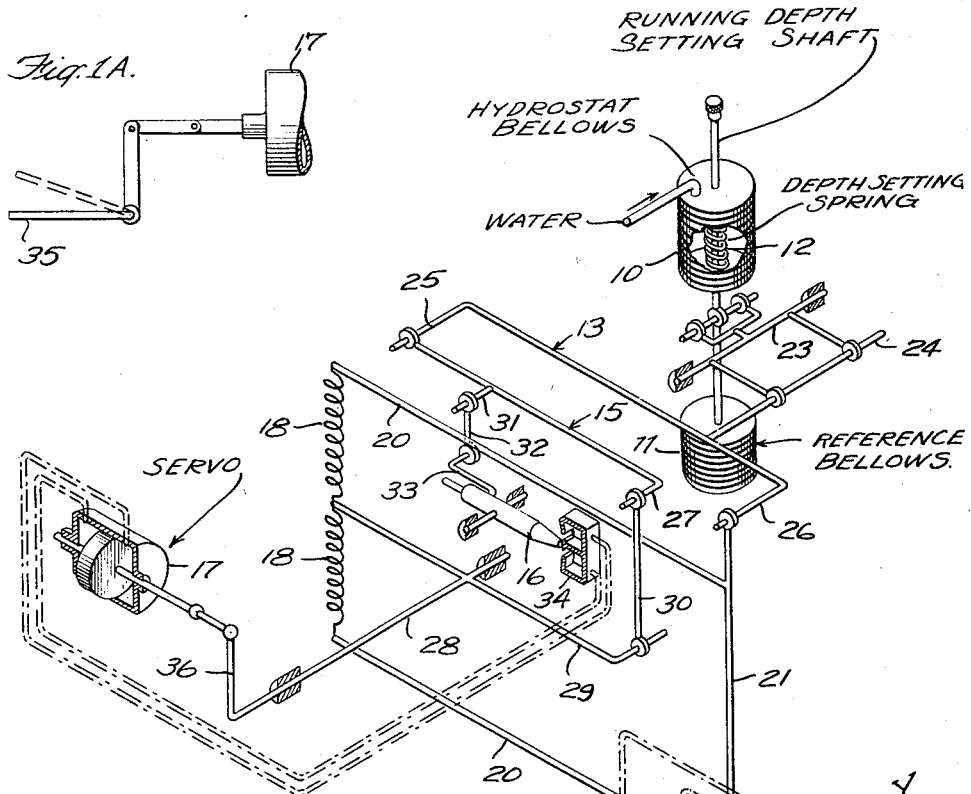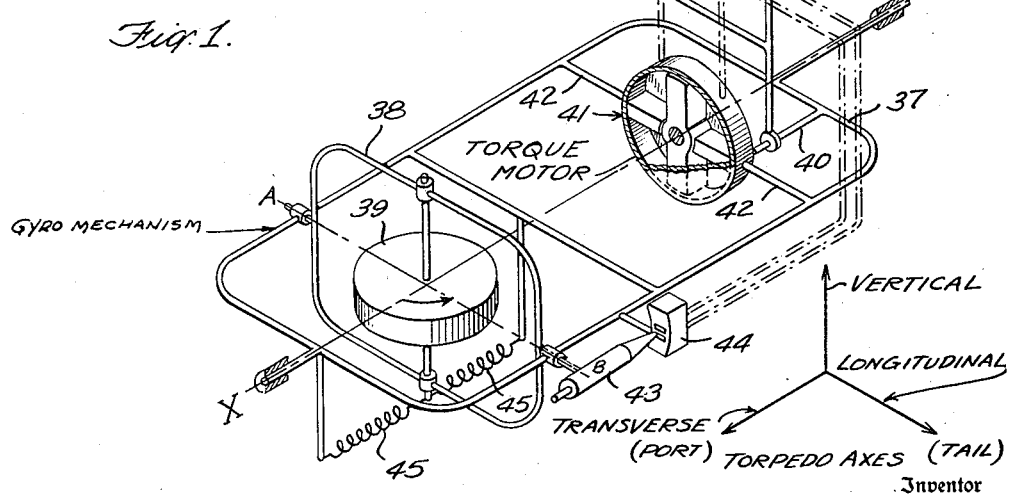

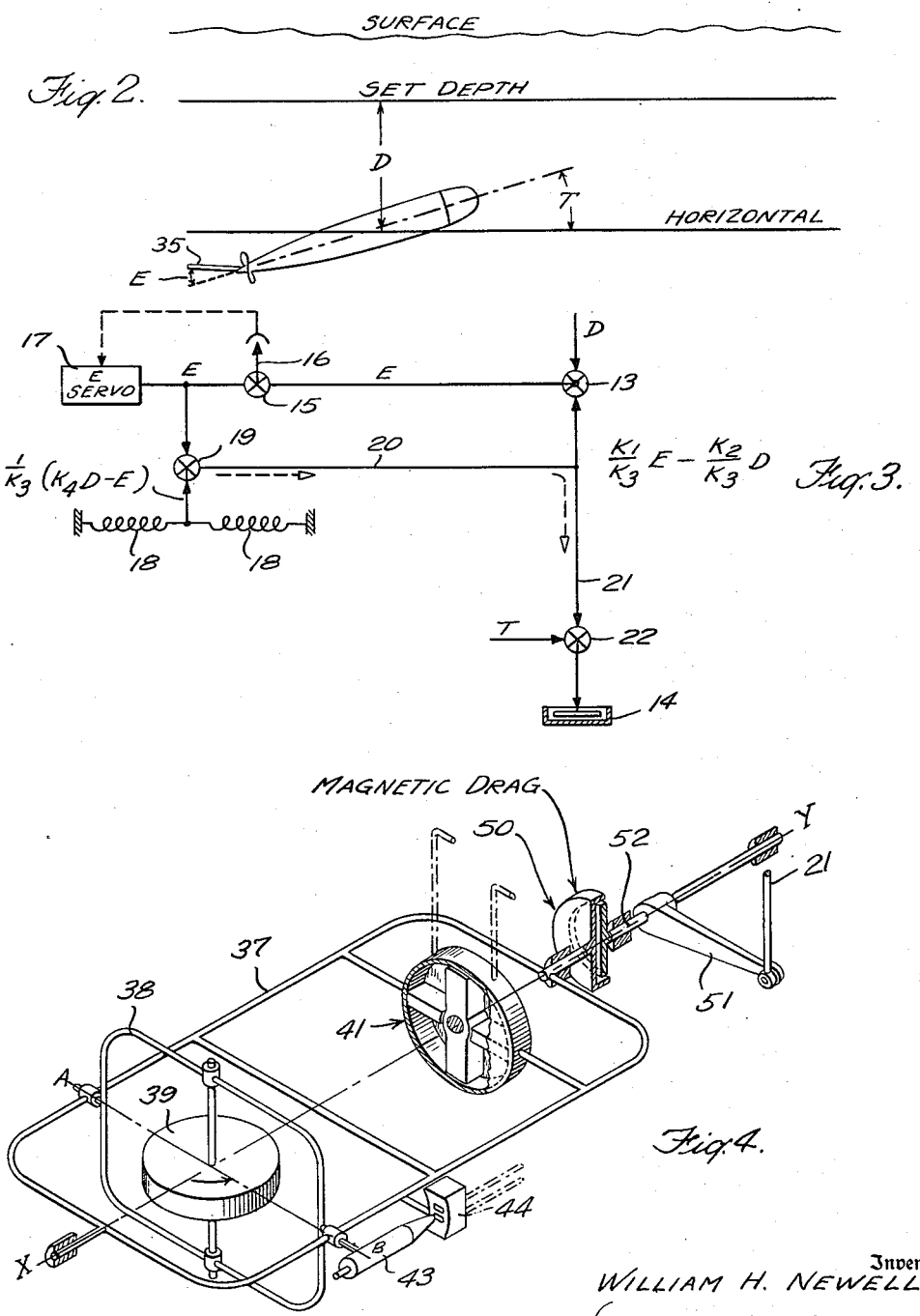

2,920,596

DEPTH CONTROL MECHANISM FOR DIRIGIBLE SUBMARINE

William H. Newell, Mount Vernon, N.Y., assignor to Sperry Rand Corporation, a corporation of Delaware Application April 17, 1951, Serial No. 221,388

12 Claims. (Cl. 114—25)

This invention relates to means for controlling the vertical disposition of a dirigible submarine body, such as a torpedo, and has for a primary object to bring a torpedo quickly and smoothly into a set depth after launching and to stabilize the torpedo at that depth throughout its run.

For satisfactory performance it is necssary that a torpedo should attain its set depth in a minimum of time and with a minimum of overshoot and should be free of periodic disturbances and should maintain its depth during its motion in a horizontal plane.

The control mechanism of this invention is calculated to accomplish these ends. In accordance with the invention, the pressure responsive means, which act upon the elevator rudder to direct the torpedo and cause it to seek and hold its proper depth, are supplemented in proportion to the rates of change of certain factors so as to anticipate the approach to the set depth and cause the torpedo to level off at the proper depth smoothly and without overrun or hunting.

Independent of the supplemental anticipative control elements which function in proportion to the rates of change of certain factors, the elevator is operated by a control which, within limits, effects an elevator angle which is proportional to the depth error. This will cause the elevator to move in such a direction as to cause the torpedo to change its aspect relative to the horizontal in such a manner as to eliminate the depth error. However it can be shown that the application solely of the formula for this part of the control to the equations of motion of the torpedo in response to elevator movement results in instability in settling at the set depth. It is necessary to have supplemental anticipative control elements. The most obvious source of such control elements lies in the various derivatives of the depth error and in the aspect angle and its various derivatives which to some extent simulate the derivatives of the depth error since an aspect angle differing from that necessary to counteract the negative buoyancy of the torpedo usually indicates a rate of change of depth error.

It is desirable to limit these to as few as possible and to as low derivatives as possible. The rate of change of depth is readily obtainable from the motion of the hydrostatic element through the use of dashpots or viscous drag means. Applying this element in addition to depth error to control proportionately the elevator still does not give the proper stability in settling at set depth. Additional elements are necessary. The measurement of the second derivative of depth by inertia means is possible but poor due to the effect of acceleration of the torpedo on these same means. Other mechanical means of obtaining the second derivative of depth error appear to have such time delay as to be impractical. The aspect angle itself is difficult to obtain with sufficient accuracy requiring a very accurate stable vertical but its rate of change can be readily measured with a rate or constrained gyro. This rate of change of the aspect angle approximates the second derivative of the depth error and when introduced in the control together with the depth error and rate of change of depth error gives stability in settling to a set depth. The form of the control equation upon which this invention is predicated is therefore (1) $\quad (K_2 p + K_4) D + K_3 p T = -K_5 + (K_1 p + 1) E$ where $K_1$, $K_2$, $K_3$, $K_4$ and $K_5$ are mechanical parameters, $p$ equals $$\frac{d}{dt}$$

being the first derivative with respect to time, D is the depth error, E is the elevator angle and T is the aspect angle of the torpedo, that is, the angle of the fore-and-aft axis of the torpedo to the horizontal.

The term $K_1 p E$ comes from the impracticability of moving the elevator instantaneously to a position corresponding to an instantaneous possible change in the rates of either depth error D or aspect angle T.

The parameter $K_5$ represents a certain elevator angle necessary to compensate for the negative buoyancy of the torpedo so that it will maintain the set depth during motion at uniform speed in a horizontal plane. Disregarding that parameter, the equation may be written (2) $\quad p(K_2 D + K_3 T - K_1 E) = E - K_4 D$ Multiplying by $1/K_3$ the equation becomes (3) $\quad p\left[\frac{K_2 D}{K_3} + T - \frac{K_1 E}{K_3}\right] 1/K_3 (E - K_4 D)$ Using the conventional symbol for the first derivative, the equation becomes (4) $\quad 1/K_3(K_4 D - E) = \frac{K_1 \dot{E}}{K_3} - \frac{K_2 \dot{D}}{K_3} - \dot{T}$ Thus the quantity $K_4 D - E$ is to be made equal to the rate of change of the quantity $K_1 E - K_2 D - K_3 T$. The invention contemplates accomplishing this mechanically by a damper mechanism equivalent to a pure viscous drag or damper in which the torque developed is proportional to the velocity or rate of change of the angle, expressed $Ta = \mu \dot{\theta}$, where $Ta$ is applied torque, $\theta$ is the displacement and $\mu$ represents the drag constant. A torque proportional to $1/K_3(K_4 D - E)$ is developed and transmitted to the damper the displacement of which is proportional to $$\frac{K_1 E}{K_3} - \frac{K_2 D}{K_3} - T$$

and is combined with the depth error indication or quantity to determine the elevator angle.

Preferably a suitable gyroscopically controlled mechanism is used as the damper mechanism in lieu of a pure viscous drag, the outer gimbal of which has its bearings in the $\beta$ or transverse axis of the torpedo and the inner gimbal has its bearings in the $\phi$ or longitudinal axis of the torpedo. The torque is applied about the $\beta$ axis and the consequent precession of the inner gimbal is made to produce a torque about the $\phi$ axis which causes a precession of the outer gimbal about the $\beta$ axis. In this manner the gyro assembly is restored to its original position relative to the rest of the mechanism. A take-off from the outer gimbal is connected to transmit the stated displacement at a rate proportional to the first derivative of the displacement.

Means in the form of a torque motor are provided under the control of the inner gimbal to counteract the initial torque applied to the outer gimbal, and prevent any displacement of that gimbal as a result of torque about the $\beta$ axis.

There is illustrated diagrammatically in the accompanying drawings a control mechanism which performs in accordance with the above equation, and the invention will now be explained with reference to those drawings in which:

Fig. 1 is a line diagram of the mechanism showing the functional relationship of all the parts;

Fig. 1A is a diagrammatic detail of the elevator and a portion of the servo;

Fig. 2 is a diagram indicating the different quantities that enter into the equation;

Fig. 3 is a simplified schematic of the system indicating the solution of the problem, and Fig. 4 is a line diagram of a modified form of mechanism to compute the desired rates.

Fig. 2 indicates diagrammatically the quantities to which the letters used in the equation are applied. The torpedo is set to run at a certain depth below the surface, which is the "set depth." Any deviation from that is the depth error indicated herein as D, which of course may be positive or negative. The torpedo, indicated as propeller driven, is shown as having been launched a considerable distance below the set depth and as nosing upward with an up elevator. The instantaneous value of D is indicated. The angle to the horizontal is indicated as T and the angle of the elevator as E. While the control mechanism of the invention, which operates to bring the torpedo asymptotically into the set depth, functions completely only within a limited pressure range either side of the set depth, for the purpose of the present explanation the torpedo will be assumed to be at all times within that range.

Means responsive to the hydrostatic pressure and hence constituting a measure of depth are carried by the torpedo. These are indicated diagrammatically in Fig. 1 and are of conventional and well-known construction. A bellows 10 has internal communication with the outside water and has an axial stem which is captured to move axially with the bottom wall of the bellows. The lower end of the stem is attached to one end of a reference bellows 11 which has an invariable internal pressure, usually being completely evacuated. A spring 12 surrounds the stem within the bellows 10 and its tension is settable by turning the stem which is done by a suitable tool. This spring acts to determine the pressure at which the control mechanism is neutral or inactive and hence is termed the "depth setting spring."

Fig. 3 shows schematically by means of conventional symbols the functioning of the mechanism to solve the problem. The amount that the bellows stem is displaced is proportional to the depth error D. That quantity comes in to one side of a differential 13 the other side of which is connected to the drag 14 indicated as a viscous or magnetic drag but which is shown in Fig. 1 as a gyro mechanism. The center of differential 13 is connected to one side of a differential 15 the center of which operates a control nozzle 16 for the elevator servo 17. This servo feeds back to the other side of differential 15. It will therefore be seen that, as indicated, the output of differential 13 is a measure of E, being effective to control the servo.

As shown, the feed back also functions to deflect a pair of centering springs 18, which store a torque proportional to the algebraic sum of D and E and are differentially connected to the feed back and to the drag 14 in such a way as to introduce their torque into the drag. Schematically in Fig. 3 the outer ends of the springs are shown as fixed and their center or inner ends connected to the center of a differential 19 the sides of which, respectively, are connected to the feed back and to the drag, the hollow arrows indicating the line of action of their torque on the drag. Since in the actual mechanism the linkage which transmits the torque to the gyro gimbal is the one displaced to deliver the computed quantity to the differential 13, this schematic accordingly indicates such duplication of function.

The deflection of the centering springs 18 is a function of the algebraic sum of D and E and, as indicated, will be proportional to the quantity $1/K_3(K_4D-E)$. The torque which is proportional to the displacement is transmitted through link 20 to link 21 which connects the drag 14 and the differential 13. This will cause a displacement of link 21 by an amount proportional to $1/K_3(K_1E-K_2D)$, plus the angle T which is introduced into the line of link 21 by differential 22, the displacement being at a rate proportional to the first derivatives of the quantities E, D and T.

Turning now to the diagram of an actual mechanism, as shown in Fig. 1, the analogy to the schematic showing of Fig. 3 will be apparent. The differentials 13 and 15 are of the differentially connected lever or link type instead of the gear type. A rock shaft 23 in fixed bearings has a crank connection, as indicated, with the stem of the pressure responsive bellows, and is connected by radial arms with an arm 24 on the differential 13, the arm 24 being mounted in bearings so as to be free to rotate. The differential has two parallel arms 25 and 26 which are rigidly connected to the ends of the cross member to which the arm 24 is attached. The arm 24 is connected off center, as shown, the lengths of the radii of the arms 25 and 26 from the rotative axis of the differential being a parametrical factor.

The differential 15 is pivotally attached at one end to arm 25 and an arm 27 at the other end is connected to the feed back 28 from the servo 17 through lever arm 29 and link 30 which is pivotally attached to the arms 27 and 29. At a parametrical distance from the connection with the arm 25, the differential 15 has an arm 31 which is connected by link 32 to an operating crank 33 on nozzle 16.

This nozzle 16 is of the conventional air pressure type and cooperates with reversing valve 34 the two ports of which are connected to, respectively, opposite sides of the piston of servo 17, as indicated by the broken lines. The piston shaft is connected through a link and a bell crank to operate the elevator 35, as indicated in Fig. 1A.

The piston of the servo is connected by link 36 to rock the shaft 28 as a feed back. The shaft 28 is connected to the lever arm 29 intermediate its ends, the respective lengths of the component arms of lever 29 being a parametric factor. One end of lever 29 is connected to the mid point of centering springs 18, the other end being connected by link 30 to the side 27 of the servo differential 15, as above stated. The other ends of springs 18 are connected to the link 21, each end by a link 20. The link 21 leads to the drag mechanism which will now be described.

The gyro type of rate measuring device serves a double purpose. It operates similarly to a dash pot or a viscous or magnetic drag, to deliver a displacement the rate of change of which is proportional to the applied torque. It also provides a reference for establishing the quantity T.

The gyro mechanism has an outer gimbal 37, pivoted to rotate about the axis X—Y which is the transverse or β axis, and an inner gimbal 38 pivoted to the outer gimbal on the axis A—B which is the longitudinal or φ axis. The torpedo axes are indicated in the diagram at the right of the gyro mechanism diagram. A spinning mass or gyro 39 has its spin axis bearing in the inner gimbal 38.

The torque from the springs 18 is transmitted to the outer gimbal through an arm 40 on the gimbal offset from the X—Y axis a distance which is a parametric factor. This torque applied about the X—Y axis causes a precession of the gyro about the A—B axis. Means are provided under the control of this precession to prevent the outer gimbal from being angularly displaced by the torque applied to the arm 40. These means consist of a torque motor 41 and controlling means associated therewith for applying a counter torque to the outer gimbal. As shown diagrammatically, the torque motor is air controlled and is of the vane type, having an outer vane-carrying part attached by arms 42 to the gimbal and rotative in sealed relation about an inner fixed part. The outer part is shown as cylindrical with two vanes, with the inner fixed part constituting two abutment vanes normally at right angles to the rotative vanes, thus dividing the interior of the motor into four chambers. An air nozzle 43 is carried by the A—B axis and therefore follows the precession of the inner gimbal. The air nozzle cooperates with a valve block 44 having two ports which communicate with the torque motor and lead to opposite sides of the fixed vanes by conduits indicated by the broken lines. The nozzle and the valve block are similar to the members 16 and 34. When the inner gimbal is centralized with respect to the outer gimbal, the nozzle is shut off. Movement in either direction brings the nozzle over one of the ports and the precession of the gyro and inner gimbal continues until the counter torque from the torque motor balances the torque impressed by the springs 18.

The inner gimbal is connected to the outer gimbal by centering springs 45 and these springs tend to maintain a certain angular relationship between the gimbals. The precession of the inner gimbal causes a deflection of the springs 45 resulting in a torque about the A—B axis. This torque about the A—B axis causes a precession of the outer gimbal about the X—Y axis. Since the torque motor characteristic is linear, the rate of precession about the X—Y axis is proportional to the deflection of the springs 18. In this manner the gyro assembly is realigned to its original position relative to the rest of the mechanism.

Thus the torque impressed by the centering springs 18 results in a displacement of the link 21 of the linear value $$\frac{K_1}{K_3}E - \frac{K_2}{K_3}D$$

and at the rate $$\frac{d}{dt}\left[\frac{K_1}{K_3}E - \frac{K_2}{K_3}D\right]$$

this displacement at the said rate being algebraically combined with the displacement D from the pressure sensitive element at the differential 13.

In addition the quantity T is constantly impressing a torque about the X—Y axis. If the torpedo is nosing up or down, as it will be when there is an elevator angle to bring the torpedo to set depth, there is relative movement between the outer gimbal and the rest of the control mechanism. A torque is thus impressed upon the outer gimbal about the X—Y axis with a resultant precession about the X—Y axis proportional to the torque, in the same manner as above described with respect to the torque impressed from the springs 18. The total resultant reaction, therefore, from the gyro mechanism is $1/K_3(K_1\dot{E}-K_2\dot{D})-\dot{T}$.

Let us assume, for example, a condition illustrated in Fig. 2 in which a torpedo has been launched below the set depth and the side 25 of the D differential is raised up and the nozzle 16 is thereby depressed. Air under pressure is thereby delivered to the left end of the servo cylinder and the piston is moved to the right, thus moving the elevator 35 to the dotted position of Fig. 1A. The feed back shaft 28 is thus rotated clockwise, raising the left end of lever arm 29 and lowering the right end. The lower spring 18 is thus expanded and the upper spring compressed, impressing a counter clockwise torque about the X—Y axis.

The clockwise rotation of the arm 29 by the feed back lowers arm 27 of the servo differential 15, thus moving the nozzle 16 back toward its neutral position.

The torque exerted by the springs 18 on the arm 21 results in a retarded upward displacement of the link 21 which serves to reduce the upward displacement of arm 25 and hence to decrease the downward displacement of the nozzle 16.

The centering springs 18, due to their deflection by the feed back, exert an upward force on the link 21 and thus impress a counter clockwise torque about the X—Y axis. This will cause a precession of the inner gimbal 38 in a direction to elevate the nozzle 43. This delivers air under pressure through the upper port of block 44 and through the corresponding conduit into the upper right hand chamber of torque motor 41, as indicated by the dotted lines. Incidentally through passages, not shown, the upper left hand and lower right hand chambers communicate, and similarly the upper right hand and lower left hand chambers communicate.

Thus there is a counter torque impressed about the X—Y axis which will prevent any precession of the outer gimbal 37 from a cause other than a torque about the A—B axis. The precession of the inner gimbal continues until the counter torque from the torque motor balances the torque from the springs 18.

This precession of the inner gimbal deflects springs 45 and thus impresses a torque about the A—B axis which causes a precession of the outer gimbal at a rate proportional to the deflection of springs 18 which continues until the gyro assembly is realigned to its original position with respect to the rest of the mechanism.

The elevator angle causes the torpedo to nose up in the instance taken for illustration. This introduces a torque upon the arm 40 through the link 21, which is proportional to the angle T, and this torque is differentially added to the torque from the springs 18 caused by the depth error and elevator angle, as indicated in Fig. 3. In this way the values of the equation are satisfied.

Obviously if the torpedo is launched above the running or set depth, the action of the control is reversed.

One added advantage of this type of control is the fact that it employs no parts subject to acceleration forces, the levers and links in all instances being counter balanced so as to minimize the effect of linear accelerations of the body.

In Fig. 4 is shown a form of rate measuring mechanism in which the rate computing means are separate from the stable element which establishes a reference plane from which to measure the change in aspect angle.

This form of rate measuring mechanism contemplates a magnetic drag device 50 or its equivalent to the rotor of which the link 21 is connected through arm 51 and shaft 52. The cooperative part of the drag 50 is secured to the X—Y shaft of a constrained gyro mechanism having an outer gimbal 37 and an inner gimbal 38 and a torque motor 41 similar to that of Fig. 1. The two gimbals, however, are not connected by centering springs and hence the precession of the inner gimbal does not impose a torque on the A—B axis and hence does not cause the outer gimbal to precess. The torque motor 41 counteracts the torque applied through link 21 to the X—Y axis and so holds the outer gimbal relatively stable.

Because of the drag torque device, the displacement of the link 21 will be at a rate proportional to the torque applied.

As the torpedo noses up or down, there is relative movement between the rest of the mechanism and the outer gimbal. The drag device holds the link 21 against instantaneous movement with a consequent deflection of the springs 18 and a movement of the nozzle 16 in a direction to give a proper elevator angle. The deflection of the springs 18 impresses a torque upon the link 21 which is proportional to the deflection and causes a displacement of the link 21 which because of the drag device is at a rate proportional to the torque applied.

The word "torque" as used herein is not intended to be limited to an angular force which it would be strictly when used in connection with gear differentials, but is intended to comprehend any force which may be applied linearly or angularly.

It will be understood that the particular mechanisms diagrammatically illustrated and above described are representative only and that the principle of the invention defined in the following claims may be carried out by other equivalent mechanism.

What is claimed is:

1. Depth control means for a torpedo or the like comprising a body having propulsion means, hydrostatic pressure responsive means on the body settable to a selected depth and having an output proportional to the depth error, an elevator, servo means for actuating the elevator, a control for the servo means, a feed back from the servo means, operating means for the control differentially governed by the feed back and the output of the pressure responsive means, a torque storing device, a rate measuring device differentially connected to the output of the pressure responsive means and adapted to effect a displacement at a rate proportional to the applied torque, means for differentially introducing into the torque storing device from the feed back and from the pressure responsive means a torque proportional to a function of the difference between the depth error and feed back, and means for transmitting the torque from the torque storing device to the rate measuring device.

2. Depth control means for a torpedo or the like comprising a body having propulsion means, hydrostatic pressure responsive means on the body, an elevator, servo means for actuating the elevator, a control for the servo means, differential operating means for the control, a feed back from the servo to one side of the differential operating means, a rate measuring device adapted to effect a displacement at a rate proportional to torque applied thereto, means differentially combining the output of the rate measuring device with the output of the pressure responsive means, means connecting the output of said combining means with the other side of the differential operating means, and centering springs differentially connected to the servo feed back and to the rate measuring device, whereby a force proportional to the deflection of the centering springs is transmitted as a torque to the rate measuring device.

3. Depth control means for a torpedo or the like comprising a body having propulsion means, hydrostatic pressure responsive means on the body, an elevator, servo means for actuating the elevator, a control for the elevator, differential means connected to operate the control and operatively connected on one side to the servo means, torque means connected differentially to the pressure responsive and servo means to develop a torque proportional to the quanity $1/K_3(K_4D-E)$ where the constants $K_3$ and $K_4$ are mechanical parameters, D is the output of the pressure responsive means and E is the output of the servo means, a rate measuring device connected to receive the said torque and adapted to convert the torque to movement proportional to the quantity $1/K_3(K_2\dot{D}-K_1\dot{E})+T$ where the constants $K_1$, $K_2$ and $K_3$ are mechanical parameters, D is the output of the pressure responsive means, E is the output of the servo means and T is the angle of the body to the horizontal, means differentially combining the outputs of the rate measuring and of the pressure responsive means, and means operatively connecting the output of the combining means with the other side of the said differential means.

4. A depth control for a torpedo or the like adapted to perform according to the equation $$K_4D-E=K_1\dot{E}-K_2\dot{D}-K_3\dot{T}$$

where the constants represent mechanical parameters, D is the depth error from a set depth, E is the elevator angle and T is the angle of the torpedo to the horizontal, comprising a self propelled submarine body, hydrostatic pressure responsive means on the body settable to a selected depth and having an output proportional to the depth error, an elevator, a servo in charge of the elevator and having a feed back, control means for the servo differentially operated by the feed back and the depth error output, centering springs having a torque output proportional to their deflection, means operatively connecting the centering springs differentially with the feed back and the depth error output adapted to effect a displacement proportional to $K_4D-E$, rate measuring device the rate of output of which is proportional to the applied torque and is equal to $K_1\dot{E}-K_2\dot{D}-K_3\dot{T}$ when a torque proportional to the $K_4D-E$ is applied, means for applying the torque from the centering springs to the rate measuring device, and means for combining the output of the rate measuring device to the depth error output.

5. A depth control for a torpedo or the like adapted to perform according to the equation $$K_4D-E=K_1\dot{E}-K_2\dot{D}-K_3\dot{T}$$

where the constants represent mechanical parameters, D is the depth error from a set depth, E is the elevator angle and T is the angle of the torpedo to the horizontal, comprising a self propelled submarine body, hydrostatic pressure responsive means on the body settable to a selected depth and having an output proportional to the depth error, an elevator, a servo in charge of the elevator and having a feed back, control means for the servo differentially operated by the feed back and the depth error output, centering springs having a torque output proportional to their deflection, means operatively connecting the centering springs differentially with the feed back and the depth error output adapted to effect a deflection proportional to $K_4D-E$, a gyro mechanism having an outer gimbal mounted to rotate about an axis transverse of the body and an inner gimbal bearing in the outer gimbal about an axis longitudinal of the body, means for converting a precession of the inner gimbal into a torque about the inner gimbal axis and a precession of the outer gimbal, means differentially coupling the outer gimbal to the depth error output, and means for applying the torque from the centering springs as a torque about the axis of the outer gimbal at a radius from the outer gimbal axis to effect a movement equal to $K_1\dot{E}-K_2\dot{D}-K_3\dot{T}$.

6. In the depth control mechanism as defined in claim 5, means operated by the inner gimbal of the gyro mechanism to counteract a torque about the outer gimbal axis comprising a torque motor connected to create a torque about the outer gimbal axis, a control for the torque motor movable oppositely from a neutral position to apply a force to the torque motor in opposing directions, and means operatively connecting the control for the torque to the inner gimbal.

7. A depth control for a self propelled submarine body comprising hydrostatic pressure responsive means on the body settable to a selected depth and having an output proportional to the depth error, an elevator, servo means for actuating the elevator, a control for the servo means, a feed back from the servo means, a first differential means connecting the depth error output to one side of the first differential, a second differential, means connecting the center of the first differential to one side of the second differential, means connecting the feed back to the other side of the second differential, means connecting the center of the second differential to said control, rate measuring device the rate of output of which is proportional to the applied torque, means connecting the output of the rate measuring device to the other side of the first differential, and centering springs differentially connected to the feed back and to the damper, whereby the centering springs deliver a torque to the damper proportional to their deflection.

8. A depth control for a self propelled submarine body comprising hydrostatic pressure responsive means on the body settable to a selected depth and having an output proportional to the depth error, an elevator, servo means for actuating the elevator, a control for the servo means, a feed back from the servo means, a first differential, means connecting the depth error output to one side of the first differential, a second differential, means connecting the center of the first differential to one side of the second differential, means connecting the feed back to the other side of the second differential, means connecting the center of the second differential to said control, a rate measuring device the rate of output of which is proportional to the applied torque, means connecting the output of the rate measuring device to the other side of the first differential, centering springs differentially connected to the feed back and to the rate measuring device, whereby the centering springs deliver a torque to the rate measuring device proportional to their displacement, and means for differentially adding to the said torque a torque proportional to the angle of the body to the horizontal.

9. A depth control mechanism as defined in claim 8 in which the rate measuring device comprises a gyro mechanism having an outer gimbal mounted to rate about an axis transverse of the body and an inner gimbal bearing in the outer gimbal about an axis longitudinal of the body and centering springs connecting the two gimbals, and in which the connection of the first mentioned centering springs to the device is a conection to the outer gimbal at a selected radius from the axis of the outer gimbal, whereby the torque from the first mentioned centering springs is applied to the outer gimbal axis.

10. A depth control mechanism according to claim 9 which includes a torque motor operative to apply a torque to the outer gimbal about its axis of rotation, and means controlled by the precessional displacement of the inner gimbal for energizing the torque motor.

11. Depth control means for a torpedo or the like comprising a body having propulsion means, hydrostatic pressure responsive means on the body settable to a selected depth and having an output proportionate to the depth error, an elevator, servo means for actuating the elevator, a control for the servo means, a feed back from the servo means, operating means for the control differentially governed by the feed back and the output of the pressure responsive means, means for modifying the output of the pressure responsive means including a gimbal mounted gyro mechanism having means actuated by the inner gimbal to counteract a torque applied to the axis of the outer gimbal, a drag torque device having one part coupled to the axis of the outer gimbal, means differentially connecting the other part of the drag torque device to the output of the pressure responsive means, and means actuated by the pressure responsive means for imposing a torque upon the said connecting means.

12. Depth control means for a torpedo or the like comprising a body having propulsion means, hydrostatic pressure responsive means on the body settable to a selected depth and having an output proportionate to the depth error, an elevator, servo means for actuating the elevator, a control for the servo means, a feed back from the servo means, operating means for the control differentially governed by the feed back and the output of the pressure responsive means, means for modifying the output of the pressure responsive means including a gimbal mounted gyro mechanism having means actuated by the inner gimbal to counteract a torque applied to the axis of the outer gimbal, a drag torque device having one part coupled to the axis of the outer gimbal, means differentially connecting the other part of the drag torque device to the output of the pressure responsive means, and means differentially actuated by the pressure responsive means and by the feed back for imposing a torque upon the said connecting means.

References Cited in the file of this patent
UNITED STATES PATENTS 2,693,921    McKissack et al. _____ Nov. 9, 1954